United States Patent [19]
Klein

[11] 3,979,662
[45] Sept. 7, 1976

[54] PARALLELING OF INVERTERS FOR LOW HARMONICS
[75] Inventor: Frank N. Klein, Kenosha, Wis.
[73] Assignee: Eaton Corporation, Cleveland, Ohio
[22] Filed: May 5, 1975
[21] Appl. No.: 574,771

[52] U.S. Cl. ............................ 321/27 MS; 321/9 A
[51] Int. Cl.² ........................................ H02M 7/515
[58] Field of Search ............... 321/9 R, 9 A, 27 MS, 321/DIG. 1

[56] References Cited
UNITED STATES PATENTS

| | | | |
|---|---|---|---|
| 3,671,846 | 6/1972 | Corey | 321/27 MS |
| 3,781,616 | 12/1973 | Mokrytzki et al. | 321/27 MS |
| 3,781,635 | 12/1973 | Saver | 321/9 R |
| 3,792,286 | 2/1974 | Meier | 321/27 MS X |

Primary Examiner—William M. Shoop
Attorney, Agent, or Firm—Teagno & Toddy

[57] ABSTRACT

Two switching-type three-phase inverters are connected to supply electrical power to a common load in such a way that the load voltage has lower harmonic content than that of either inverter alone. Harmonic content is reduced by interconnecting the inverters by means of transformers to cancel some of the harmonic voltages, but a main component of output power of one of the inverters is used directly without being transformed, so that the total required KVA of the transformers is relatively small. Each phase of load voltage is produced from four or six component phasors, by adding two or three voltages from one of the inverters and two or three voltages from the other.

18 Claims, 7 Drawing Figures

3,979,662

PARALLELING OF INVERTERS FOR LOW HARMONICS

BACKGROUND OF THE INVENTION

The output voltage waveforms of switching-type inverters ordinarily contain many high order harmonics that are undesirable. A well-known technique of the prior art for reducing some of the harmonics is to cancel them by algebraically or vectorially adding together waveforms having out-of-phase harmonics of equal frequency and amplitude. One technique of the prior art is to employ two 3-phase inverters to drive a single load, with the output voltages of one of the inverters phase shifted with respect to the output voltages of the other. In load sharing schemes of this type, paralleling reactors are sometimes employed, with each extremity of each paralleling reactor connected to one corresponding phase terminal of each inverter and a center-tap of the paralleling reactor connected to the load. When the phase shift between the inverters is 30° many of the significant harmonics at the load are reduced 50% by this scheme.

Other circuit connections used in the prior art for reducing harmonic components involve adding transformed voltage components in series to produce each phase of the load voltage. Where the inverters are pulse-width modulated, so that the output phase voltage waveform of each inverter has more than the usual number of steps in each cycle, some harmonics have larger amplitudes, making some form of harmonic reduction very desirable. Moreover, some pulse-width modulated waveforms could have relatively large circulation of certain harmonic currents between the two paralleled inverters. Isolation transformers have been used in the prior art to prevent such circulation.

SUMMARY OF THE INVENTION

The present invention relates to driving a common three-phase electrical load simultaneously from two switching-type inverters, where each inverter produces three-phase voltage. The inverters are employed with transformers in such a way as to cancel many of the harmonics, to prevent circulation of harmonic currents between the outputs of the two inverters, and yet to require only a relatively small total weight and size of transformer elements.

In one specific illustrative embodiment of the invention, the main power output of one inverter, referred to as the first inverter, is not transformed. Only a relatively small second component of voltage from the first inverter is transformed, and this small second component is connected in series with the untransformed main output of the first inverter for harmonic cancellation. The output power of the second inverter is passed through an isolation transformer, and a secondary winding of the transformer is connected in series with the output of the first inverter, with its phase voltage offset by some amount therefrom, for example, 30°.

A tertiary winding of an isolation transformer of the second inverter produces a relatively small voltage, which is picked off from a different phase than the above-mentioned secondary winding and is connected to add in series with that secondary winding voltage and with the foregoing two voltages of the first inverter. The resulting summation of four voltages produces one phase voltage for the electrical load. Each of the other two load phases is produced in a symmetrically similar manner, so that twelve phasors altogether are employed to produce three phases of load voltage.

Other specific embodiments employ six phasor voltages to produce each load phase voltage. Other aspects of the invention are apparent from the accompanying description, claims, and figures.

BRIEF DESCRIPTION OF THE FIGURES

FIG. 2b is a switching sequence for one cycle of another silicon-controlled rectifier associated with the same phase of the same inverter as the SCR of FIG. 2a;

DESCRIPTION OF A PREFERRED EMBODIMENT

Figure 1:
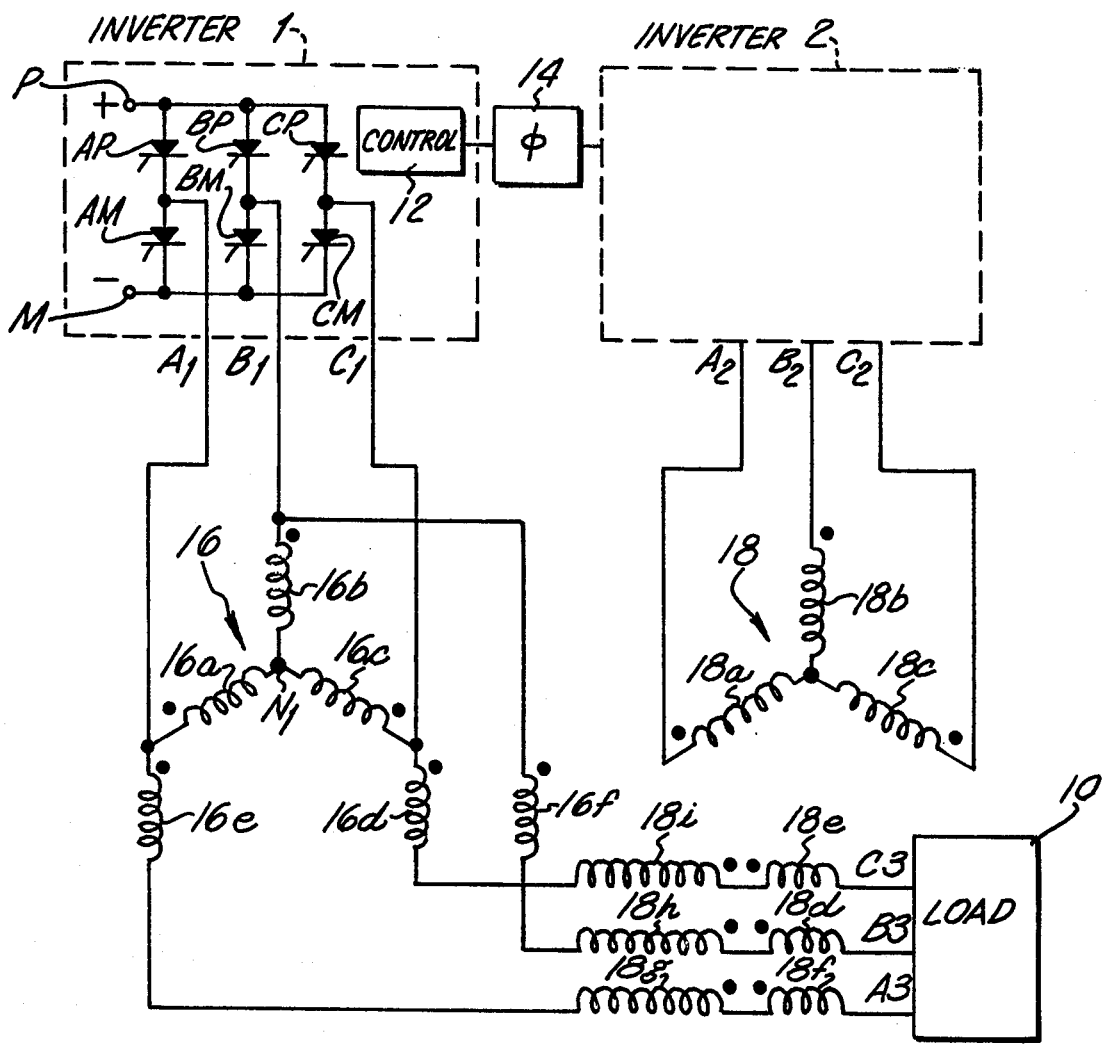
FIG. 1 is a schematic diagram of a preferred embodiment of the invention in which two inverters drive a common load.

In a preferred embodiment of the invention, FIG. 1, two inverters 1, 2 provide three-phase power for an electrical load 10. The voltage waveforms at the output terminals A1, B1, C1 of the inverter 1 have a high harmonic content. Inverter 2 produces voltage waveforms at its output terminals A2, B2, C2, also having high harmonic content. In accordance with the present invention, power from the inverter 1 is combined with power from the inverter 2 in such a way as to produce power for the load 10 at its load terminals A3, B3, C3 having a much lower harmonic content in its voltage waveform than the harmonic content of either inverter alone. This is accomplished by producing each phase of voltage for the load 10 by adding together in series four components of voltage, all of different phase, two of which are derived from inverter 1 and two of which are derived from inverter 2.

Inverter 1 includes six SCR's, namely AP, AM, BP, BM, CP, CM. A pulse-width modulated inverter of this type is described in U.S. Pat. No. 3,538,420 to Frank N. Klein, issued Nov. 3, 1970, and made a part hereon by reference. The anode of the SCR AP is connected to a positive dc bus P, and the cathode is connected to the terminal A1 and to the anode of the SCR AM. The cathode of the SCR AM is connected to a negative dc bus M. The SCR's BP, BM are connected to the positive and negative busses, P, M, respectively, and to the terminal B1 in a similar manner; the SCR's CP, CM are similarly connected with the terminal C1. A control circuit 12 provides electrical signals to the gate electrodes of the SCR's to turn them on in a predetermined time sequence, and also to turn them off by controlling commutation circuits which are not shown.

Inverter 1 is connected with a phasing circuit 14, which merely controls the relative phases of operation of inverters 1 and 2 in order to produce a predetermined phase shift, for example 30°, between the output waveforms of the two inverters. Inverter 2 is identical with inverter 1 in the embodiment being described.

A transformer 16 has primary windings 16a, 16b, 16c, all of which are connected in a wye configuration at a common point N1. The other end of each of the primary windings 16a, 16b, 16c is connected to a respective terminal A1, B1, C1 of inverter 1, representing phases A, B, and C. The transformer 16 has secondary windings 16d, 16e, 16f whose voltages are about 37% of the voltage of the primary windings, and which are connected in series between the terminals A1, B1, C1 and the load 10, with polarities as shown by the dots on FIG. 1. The secondary winding 16e, although it is connected with the terminal A1, has a phase associated with phase B. The secondary windings 16f, 16d are similarly connected with terminals B1, C1, respectively, but produce voltages that are associated with phases C and A, respectively.

The main output terminals A2, B2, C2, representing phases A, B, C of inverter 2, are connected to primary windings 18a, 18b, 18c respectively of a transformer 18. The transformer 18 has secondary windings 18g, 18h, 18i that are connected in series respectively with windings 16e, 16f, 16d, and are associated with phases A, B, C, respectively of the inverter 2. The turns ratio between the primary and secondary windings of the transformer 18 is one-to-one.

The transformer 18 also has tertiary windings 18f, 18d, 18e that are connected in series with the windings 18g, 18h, 18i, respectively. The phases of the voltages of windings 18f, 18d, 18e are, however, associated with the phases of terminals C2, A2, B2 respectively of inverter 2, and therefore not with the same phases as the windings 18g, 18h, 18i, with which they are connected. The polarity of voltage induced in the tertiary windings with respect to the voltage of the primary windings is as indicated by the dots in FIG. 1. The other end of each of the tertiary windings 18f, 18d, 18e is connected to the load terminals A3, B3, C3, respectively of the load 10.

Figure 2A:
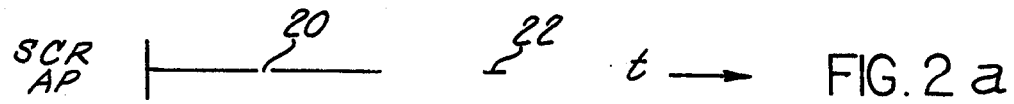
FIG. 2a shows a switching sequence for one cycle of a silicon-controlled rectifier (SCR) in one of the inverters.
Figure 2B:
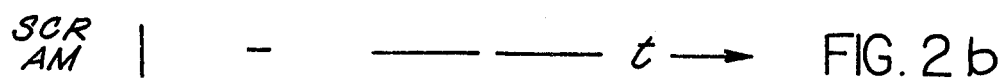

Inverter 1 produces output waveforms at its terminals A1, B1, C1 that are described by reference to FIG. 2. During one cycle of the fundamental frequency, the SCR AP conducts during three time intervals that are shown as heavy horizontal lines in the time graph of FIG. 2a. As shown in FIG. 2b, the SCR AM is conductive during portions of a cycle in which the SCR AP is non-conductive. Thus the output terminal A1 of inverter 1 is connected alternately to the positive dc bus P and the negative dc bus M. The durations of a non-conductive interval 20 and of a conductive interval 22 of the SCR AP are varied for purposes of pulse-width modulation. The SCR's of phases B and C are conductive and non-conductive in accordance with time patterns similar to those phase A, except that the waveforms of phases B and C are delayed by 120° and 240° respectively after the waveforms of phase A that are shown in FIGS. 2a, 2b.

Figure 2C:
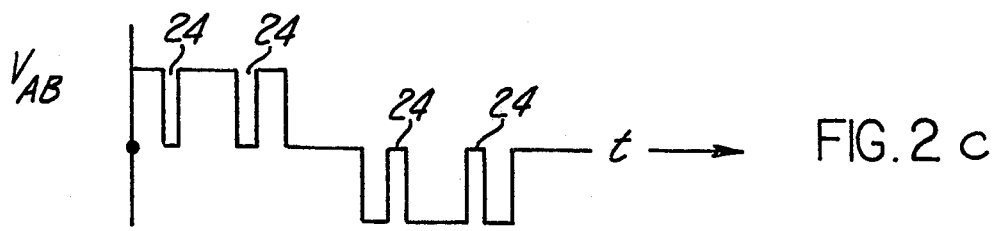
FIG. 2c is a line-to-line voltage waveform at the output terminals of one inverter.

A voltage waveform from terminal A1 to terminal B1 is shown by FIG. 2c to have notches, at times 24, that represent pulse-width modulation. The waveform $V_{AB}$ of FIG. 2c clearly contains many harmonics in addition to the fundamental frequency. Line voltages $V_{BC}$ and $V_{CA}$ of the other two phases are similar in waveform to the voltage $V_{AB}$, but are displaced lagging by 120° and 240° respectively.

Figure 2D:
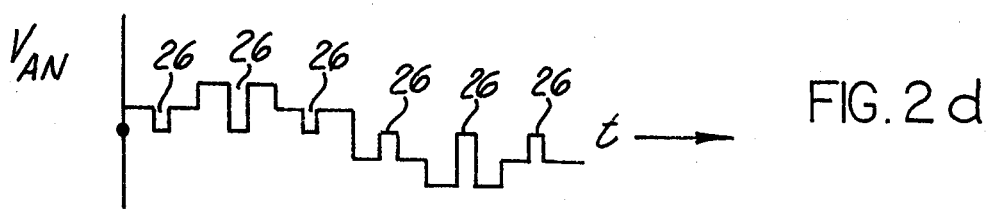
FIG. 2d is a line-to-neutral voltage waveform at an output terminal of the same inverter.

A line-to-neutral voltage waveform $V_{AN}$ for phase A is shown in FIG. 2d, with the notches that are created for pulse-width modulation indicated by reference numerals 26. Terminals B1 and C1 of inverter 1 have similar waveforms with respect to the neutral point N1, except phase-displaced as before.

Waveforms at the output terminals A2, B2, C2 of inverter 2 are identical to those of inverter 1, except phase shifted by 30° in a leading sense of phase displacement from similarly lettered terminals of inverter 1.

Figure 3:
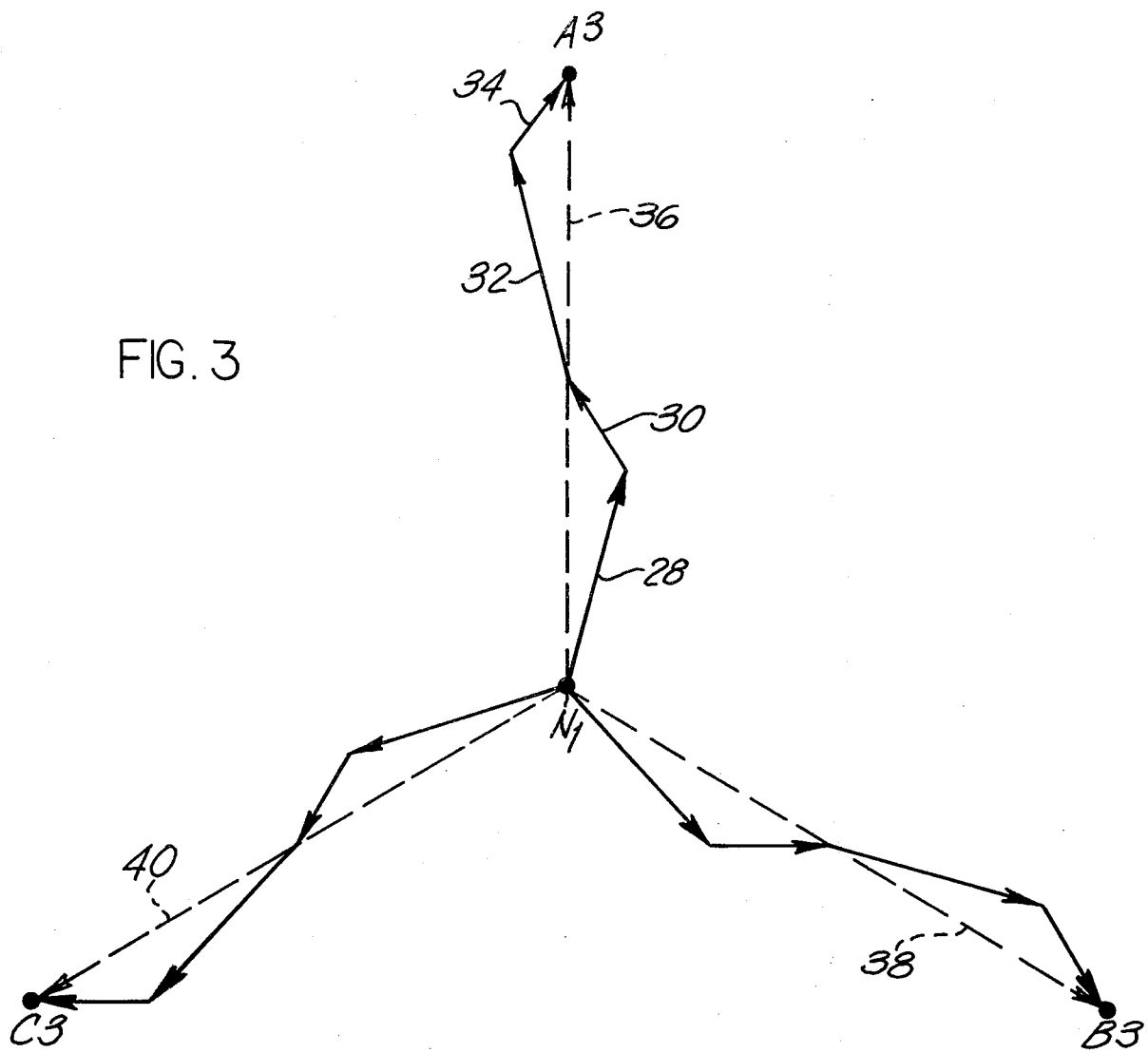
FIG. 3 is a phasor diagram showing the construction of a three-phase load voltage from twelve component phasor voltages of the preferred embodiment.

The voltage from terminal A3 of load 10 to the neutral terminal N1 is composed of four component voltages, which are represented on a phasor diagram, FIG. 3, as phasors 28, 30, 32, 34. Their sum is a phasor 36 which is the line-to-neutral voltage of the load terminal A3. The four components are: (28) the line-to-neutral voltage $V_{AN}$ which is produced between terminal A1 and the neutral terminal N1; (30) a voltage 37% as great in amplitude as $V_{AN}$ and displaced therefrom in a leading sense by 60°, produced by the secondary winding 16e; (32) a voltage equal in magnitude to $V_{AN}$ and leading $V_{AN}$ by 30°, produced by secondary winding 18g; and (34) a voltage whose amplitude is about 37% of that of $V_{AN}$, and which lags the phase of the voltage contributed by winding 18g by about 60°, produced by the tertiary winding 18e. Similar constructions for the other two phases result in phasors 38, 40, that represent line-to-neutral voltages of the terminals B3 and C3, respectively.

The resulting load phasors 36, 38, 40 are relatively free of many harmonics that are present in the inverter terminal voltages at A1, B1, C1 and A2, B2, C2, because of cancellation of certain harmonics. In the preferred embodiment, a line-to-line voltage waveform 42 at the terminals of the load 10 is very similar to a sine wave 44, as shown on FIG. 4. Pulse width modulation notches have been omitted from FIG. 4 to simplify the figure. Corners of the step-shaped waveform 42 define almost equal areas above and below the dotted sine wave curve 44. The resultant waveform 42 is much closer to the desirable shape of the sine wave than is the line-to-line voltage $V_{AB}$ with the notches 24 omitted, FIG. 2c.

Figure 4:
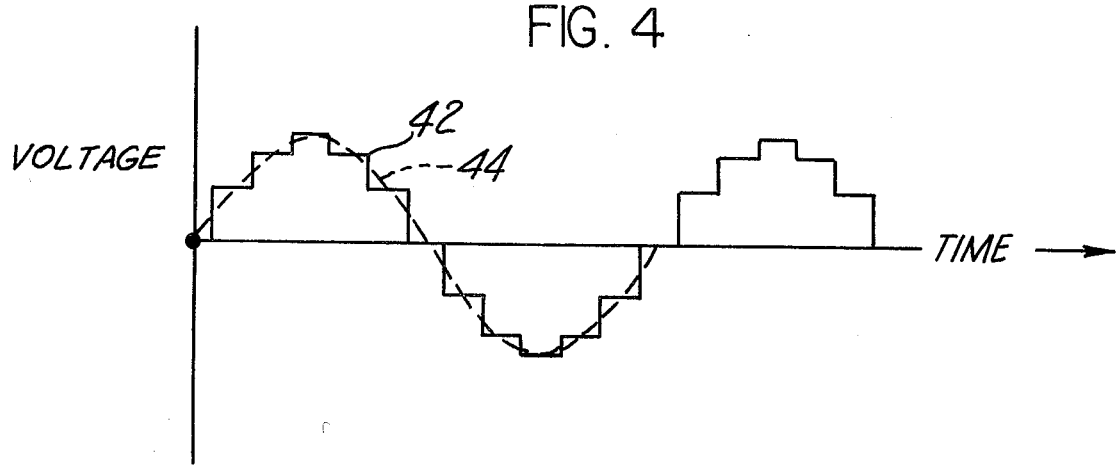
FIG. 4 shows a voltage waveform at a load terminal, illustrating reduction of harmonic content by cancellation of harmonic voltages.

The graph in FIG. 4 of load voltage in the time domain shows heuristically that the harmonic content of the load voltage waveform is considerably improved by the present invention. The improvement can be visualized also with the aid of the phasor diagram of FIG. 3. The reason that the invention reduces the third harmonic component can be seen by noting that phasor 30 leads phasor 28 by 60°, at the fundamental frequency; at the third harmonic frequency the 60° lead time of phasor 30 represents a 180° lead angle. Consequently, is phasors 30 and 28 were of equal magnitude the third harmonic components would cancel entirely, but other considerations make such equality of magnitude undesirable. Nevertheless, the third harmonic is considerably reduced. Similarly, the third harmonic of the voltage whose first harmonic is represented by the phasor 32, is partially cancelled by the third harmonic of the phasor whose first harmonic is represented by the phasor 34.

Similar consideration of phase shifts for the fifth harmonic would show that the fifth harmonic content of the load voltage 36 is substantially zero in the embodiment described. This results from partial cancellation of the fifth harmonic content of the voltages represented by phasors 28 and 32. The fundamental components of phasors 28 and 32 differ in phase by 30°; consequently, and because the waveforms are identical, their fifth harmonics differ in phase by 150°. The fifth harmonics of voltages represented by phasors 30 and 34 also assist in reducing the fifth harmonic content of the load voltage. The seventh and ninth harmonics are also small; harmonic voltages of still higher order are of less concern because of the ease of filtering them in the self-inductance of system components. In the preferred embodiment, specific harmonics which may be particularly offensive for specific loads may be eradicated or considerably diminished by choosing other values of such parameters as the phase shift between inverters 1 and 2, the ratio of voltage of windings 18f and 18g, etc. Preferably, the voltages of windings 18e and 18f etc are of equal magnitude, but in particular situations unequal magnitudes may offer advantages.

A major component of each phase of the output power of inverter 1 is transmitted to the load 10 without the need for transformation in a transformer. The component referred to is the component present at the terminal A1, (and B1, C1). As a result, the total KVA rating of transformers employed in the illustrated scheme is somewhat smaller than would be required if all of the load power had to be processed through isolation transformers. At the same time, certain harmonics are prevented from circulating in the output circuits of inverters 1 and 2.

In other embodiments of the invention, additional transformer windings are employed. Whereas, in the preferred embodiment described above, the voltage A1 had voltages added to it from phase B of inverter 1 (winding 16e), from phase A of inverter 2 (winding 18g), and from phase C of inverter 2 (winding 18f), other embodiments may include addition of further voltages from phase C of inverter 1 and from phase B of inverter 2. This second embodiment can be produced by providing additional windings on the transformers 16 and 18, which are connected in series with the windings already shown between terminals A1 and A3 of FIG. 1. The other two phases of the system would be similarly modified by addition of two or more voltages in each. In accordance with the invention, if the additional two voltages are inserted in each phase of the system, all of the additional voltages would be equal in magnitude. This results in odd or even symmetry (depending upon the phase reference) of the output voltage waveforms. The voltages are also half-wave symmetrical.

In a specific example of the second embodiment, the phase A load voltage between terminal A3 and the neutral terminal N1 can consist of components from all six phases as follows: (a) phase A of inverter 1, (b) phase A of inverter 2, (c) phase B of inverter 1, (d) phase C of inverter 2, (e) phase C of inverter 1, and (f) phase B of inverter 2. Components (a) through (d) are the same as shown in FIG. 1 of the preferred embodiment. Components (e) and (f) are added in the second embodiment. Components (a) and (b) are of equal magnitude. Components (c) through (f) are equal in magnitude and smaller than the magnitude of components (a) and (b). The voltages of inverter 2 differ in phase from corresponding voltages of inverter 1 by 60°. Each other phase voltage of a load, i.e., load phases B and C, are similarly constructed from six voltages, in a manner that is symmetrical with the manner of construction of load phase voltage A.

It should be noted that all of the foregoing discussions of phasors apply equally to delta phasors, as well as to the wye phasors that were employed as an example. Hence, phase voltage A, for example, can refer to a line-to-line voltage.

Different sets of harmonics are cancelled in whole or in part by employing different phase angles other than the 30° of the foregoing example, between the outputs of inverter 1 and inverter 2; preferably this angle is less than 90°. For phase angles between the first and second inverter exceeding 90°, the phasors 28, 32 would not add efficiently to produce load voltage. Different sets of harmonics are also cancelled in whole or in part by employing different turns ratios in the transformers 16 and 18. Various other connection schemes are possible, and the preferred embodiment employed herein to illustrate the invention is not intended to limit the scope of the claims to the particular embodiment described.

What is claimed is:

1. A method for connecting first and second switching-type three-phase inverters to supply electrical power to a common load comprising the steps of:
    establishing a phase relationship of the voltages of the second inverter with respect to the voltage of the first inverter,
    transforming the voltage of one phase of said second inverter by isolation transformer means to produce a first isolated voltage substantially equal in amplitude to the voltage of a first phase of said first inverter and differing in phase therefrom by a first predetermined angle less than 90°,
    transforming the voltage of at least one phase voltage selected from the other two phases of said second inverter by isolation transformer means to produce at least a second isolated voltage smaller in amplitude than said voltage of said first phase of said first inverter and differing in phase from said first isolated voltage by a second predetermined angle,
    transforming the voltage of at least one phase voltage selected from the other two phases of said first inverter by isolation transformer means to produce at least a third isolated voltage substantially equal in amplitude to said second isolated voltage and differing in phase from said first phase voltage of said first inverter by said second predetermined angle but in an opposite sense of leading or lagging than the sense with which said second isolated voltage differs from said first isolated voltage,
    producing a voltage for driving one phase of said common load by connecting together in series circuit arrangement said first phase voltage of said first inverter, said first isolated voltage, at least said second isolated voltage, and at least said third isolated voltage, and
    repeating the foregoing steps symmetrically for the other two phases to provide three-phase electrical power for said common load.

2. A method as defined in claim 1, and wherein said step of establishing a phase relationship comprises establishing a 30° phase difference between voltages of said first and second inverters.

3. A method as defined in claim 1, and wherein said step of establishing a phase relationship comprises a step of shifting the phase of one of said first and second switching-type inverters with respect to the phase of the other by shifting the phase of the switching times of one of said inverters with respect to the switching times of the other.

4. A method as defined in claim 1 and wherein said step of transforming the voltage of at least one phase voltage selected from the other two phases of said second inverter to produce at least a second isolated voltage comprises a step of transforming the voltage of only one phase voltage selected from the other two phases of said second inverter to produce a second isolated voltage, and wherein said step of transforming the voltage of at least one phase voltage selected from the other two phases of said first inverter to produce at least a third isolated voltage comprises a step of transforming the voltage of only one phase voltage selected from the other two phases of said first inverter.

5. A method as defined in claim 4 and wherein said step of transforming the voltage of only one phase voltage selected from the other two phases of said second inverter to produce a second isolated voltage comprises a step of transforming the voltage of only one phase voltage selected from the other two phases of said second inverter to produce a second isolated voltage differing in phase from said first isolated voltage by about 60°.

6. A method as defined in claim 4 and wherein said step of transforming the voltage of one phase of said second inverter to produce a first isolated voltage comprises a step of transforming the voltage of said one phase of said second inverter to produce said first isolated voltage differing in phase from said voltage of said first phase of said first inverter by about 30°, and wherein said step of transforming to produce a second isolated voltage comprises a step of transforming to produce a second isolated voltage whose amplitude is about 37% of the voltage of said first phase of said first inverter and differing in phase from said first isolated voltage by a second predetermined angle of about 60°.

7. A method as defined in claim 1, and wherein all of said steps of transforming and producing voltages comprise steps of transforming and producing pulse-width modulated voltages supplied by said first and second inverters.

8. A method as defined in claim 1 and wherein said step of transforming the voltage of one phase of said second inverter and said step of transforming the voltage from said other two phases of said second inverter both comprise steps of transforming said voltages by isolation transformer means whose primary windings are wye connected, and wherein said step of transforming the voltage from said other two phases of said first inverter comprises a step of transforming by isolation transformer means whose primary windings are wye connected.

9. A method for connecting first and second switchingtype three-phase inverters to supply electrical power to a common load comprising the steps of:
connecting a transformer-isolated second voltage from said second inverter to an untransformed first output voltage of said first inverter so as to add thereto with a predetermined phase offset between inverters of less than 90°,
adding, in series with said first and second voltages, a third voltage obtained from said first inverter by transformer isolation of a phase different from the phase of said first output voltage, said third voltage being of substantially smaller amplitude than said first voltage and differing therefrom in phase by a second predetermined angle,
adding, in series with said first, second and third voltages, a fourth voltage obtained by transformer isolation from said second inverter, said fourth voltage being equal in magnitude to said third voltage and differing in phase from said second voltage by said second predetermined angle except with said angle being in an opposite rotational sense from the sense of said third voltage, and
executing the foregoing steps symmetrically also for the other two phases to provide three-phase electrical power for said common load.

10. A method as defined in claim 9, and wherein said step of connecting said second voltage comprises a step of connecting said second voltage with a predetermined phase offset between inverters of 30°, and wherein said steps of adding said third and fourth voltages comprise steps of adding said third and fourth voltages at a second predetermined angle of 60° and with the amplitudes of said third and fourth voltages being about 37% of the amplitude of said first voltage.

11. A circuit for driving a common three-phase electrical load simultaneously from first and second switching-type inverters, each inverter producing three-phase voltage, comprising transformer means receiving power from said second inverter for producing a first isolated voltage substantially equal in amplitude to the main output voltage of said first inverter and differing in phase from said main output voltage of said first inverter by a first predetermined angle less than 90°; transformer means receiving power from said second inverter from a phase other than the phase of said first isolated voltage, for producing a second isolated voltage of substantially smaller amplitude than said main output voltage of said first inverter and differing in phase by a second predetermined angle in one of a leading or lagging sense from said first isolated voltage; transformer means receiving power from said first inverter for producing a third isolated voltage substantially equal in amplitude to said second isolated voltage and differing in phase from said main output voltage of said first inverter by said second predetermined angle in the opposite sense from said one sense; and interconnection means for producing three-phase final output voltages, including, for each phase of final output voltage, means for connecting in a series circuit said main output voltage of said first inverter and said first, second, and third isolated voltages with polarities in a generally cumulative sense.

12. A circuit as defined in claim 11 and wherein said first and second switching-type inverters are pulse-width modulated inverters.

13. A circuit as defined in claim 11 and further comprising means for offsetting the phase of output voltages of said second inverter from the output voltages of said first inverter by said first predetermined angle before application of said output voltages to said transformer means.

14. A circuit as defined in claim 13 and wherein said means for offsetting the phase comprises means for switching one of said switching-type inverters at different times from the switching of the other of said inverters so as to produce about a 30° phase difference between the output of said one inverter with respect to the output of said other inverter.

15. A circuit as defined in claim 11 and comprising means for establishing said first predetermined angle to be 30°, and wherein said transformer means for producing a second isolated three-phase voltage and said transformer means for producing said third isolated three-phase voltage comprise means for producing voltages whose second predetermined angle is about 60°.

16. A circuit as defined in claim 15 and wherein said transformer means for producing said second isolated voltage and said transformer means for producing said third isolated voltage comprise means for producing voltages whose amplitudes are about 37% of the amplitude of said main output voltage of said first inverter.

17. A circuit as defined in claim 11 and wherein said transformer means for producing said first isolted voltage and said transformer means for producing said second isolated voltage and said transformer means for producing said third isolated voltage comprise transformer means whose primary windings are connected in wye configuration.

18. A circuit as defined in claim 11 and further comprising transformer means receiving power from said second inverter from a phase other than the phase of said first and second isolated voltages, for producing a fourth isolated voltage of substantially smaller amplitude than said main output voltage of said first inverter; and transformer means receiving power from said first inverter from a phase other than the phase of said main output voltage of said first inverter and other than the phase of said third isolated voltage, for producing a fifth isolated voltage of amplitude substantially equal to the amplitude of said fourth isolated voltage; and wherein said interconnection means includes means for additionally connecting in said series circuit said fourth and fifth isolated voltages.

\* \* \* \* \*